United States Patent Office 3,215,739
Patented Nov. 2, 1965

3,215,739
METHOD OF PRODUCING DIBENZO (a,d)
CYCLOHEPTA (1,4) DIENES
Torkil O. Holm, Copenhagen, Denmark, assignor to
Kefalas A/S, Copenhagen-Valby, Denmark
No Drawing. Filed Oct. 10, 1961, Ser. No. 144,053
Claims priority, application Denmark, Oct. 12, 1960,
3,997
4 Claims. (Cl. 260—570.8)

The present invention relates to a particular method of preparing dibnezo [a,d]cyclohepta [1,4]dienes of the formula:

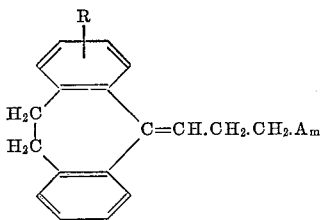

I wherein Am represents lower-alkylamino, dilower-alkylamino, the radical of a heterocyclic amine having a saturated five-membered ring, or the radical of a heterocyclic amine having a saturated six-membered ring, and R represents hydrogen, halogen such as chloro, bromo or fluoro, trifluoromethyl or lower-alkyl, as well as non-toxic acid addition salts thereof.

The compounds of Formula I and the acid addition salts thereof are valuable therapeutics and have been shown to be useful within the psychotherapy especially in the treatment of endogenic depressions.

The compounds of Formula I wherein Am represents a tertiary amino group have previously been described for example in Belgian Patent No. 577,057. According to the method described the Belgian patent the appropriate dibenzo [a,d]cyclohepta [1,4]-dien-5-on is reacted with a Grignard compound Am.CH₂.CH₂.CH₂.Mg hal, the reaction complex hydrolyzed and the resulting carbinol dehydrated. This method suffers, however, from certain disadvantages in that the Grignard compounds are not readily available and the reaction furthermore does not always proceed smoothly as small variations in the conditions of the reaction often results in considerably reduced yields.

The method of the invention distinguishes itself in that on the one hand it makes possible the preparation of such valuable dibenzo [a,d]cyclohepta [1,4]dienes of the Formula I, which are not accessible according to known methods, and on the other hand the disadvantages previously mentioned are mostly avoided.

When the compounds of Formula I are asymmetrically substituted in the phenyl rings, they may exist as two geometric isomers of the cis-trans type, which isomers although similar are not identical with respect to their pharmaco-dynamic properties. The isomers may be separated according to procedure conventional in the art.

In the foregoing Formula I and elsewhere herein, the term lower-alkyl refers to an alkyl radical containing up to and including eight carbon atoms, and preferably no more than three carbon atoms, which may have either straight or branched chain structure, for example, methyl, ethyl, propyl, isopropyl, butyl, isobutyl, amyl, hexyl, heptyl, octyl, or the like.

The method of the invention consists essentially in the production of a compound of Formula I, or an acid addition salt thereof by processes which comprise mixing and reacting a compound of the formula:

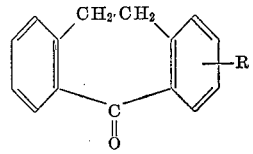

II wherein R is as defined above with an ethyl magnesium halide in an inert organic solvent, such as diethylether or tetrahydrofuran, hydrolysing the magnesium complex obtained and dehydrating the compound of the formula:

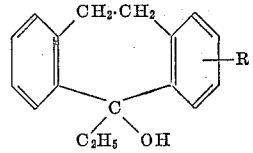

III thereby obtained subjecting the resulting compound of the formula:

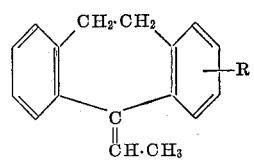

IV to reaction with an organic peroxyacid, which can be found in situ, treating the compound of the formula:

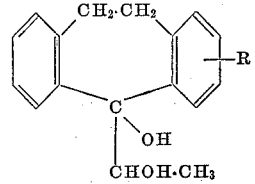

V thereby obtained with aqueous sulfuric acid, and reacting the resulting compound of the formula:

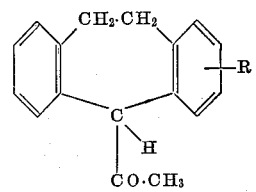

VI with formaldehyde and salt of the amine AmH, wherein Am is as defined above, whereupon the resulting compound of the formula:

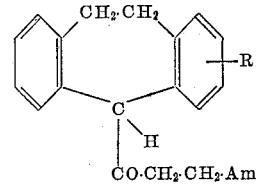

VII is reduced and the resulting compound of the formula:

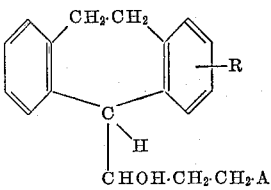

VIII dehydrated whereupon the dibenzo [a,d] cyclohepta

[1,4] diene for Formula I formed thereby is isolated as the free base or in the form of an acid addition salt and, in the event said compound of Formula I or said addition salt thereof is a mixture of isomers, isolating the individual isomers thereof, if desired, by procedure already known for the separation and isolation of such isomers.

All the compounds III–VIII are hitherto unknown substances.

The dehydration step III–IX proceeds particularly smoothly and as dehydrating agents may conveniently be employed organic acidhalides, such as acetylchloride, inorganic acidhalides, such as thionylchloride or phosphorousoxychloride, hydrogen-chloride in glacial acetic acid or the like.

The reaction step V–VI may suitably be carried out without any preceding isolation of Compound V.

The reaction step VI—VII is a so-called Mannich reaction and is conveniently carried out under the reaction conditions which are ordinarily used for this reaction type. The following reduction of the Compound VII is carried out catalytically using a platinum catalyst.

The course of reaction for the dehydration step VIII–I was not predictable as the dehydration might have taken place between two of the carbon atoms of the side chain. This dehydration is preferably carried out under the influence of strong dehydrating inorganic acid halides such as phosphorous-oxychloride or thionylchloride in the presence of a tertiary amine, such as pyridine or quinoline as a hydrogenhalide binding agent.

For obvious reasons when isolating any of the compounds of Formula I in the form of an acid addition salt, the acid is preferably selected so as to contain an anion which is no-toxic and pharmacologically acceptable, at least in usual therapeutic doses. Representative acid addition salts are hydrochlorides, hydrobromides, sulphates, phosphates, nitrates, acetates, lactates, maleates, citrates, tartrates and bitartrates, succinates, oxalates, methanesulphonates and ethanesulphonates. Other acid addition salts are likewise suitable and may be employed if desired.

The following examples are given by way of illustration only and are not to be construed as limiting:

*Example 1.—5 - (3'-dimethylaminopropylidene)-dibenzo [a,d] cyclohepta [1,4]diene and its hydrochloride*

67 grams of dibenzo [a,d] cyclohepta [1,4]diene-5-on is dissolved in 200 milliliters of anhydrous ether and a solution of 0.6 mole of ethylmagnesium bromide in ether is added while stirring and under reflux. Then water and excess acetic acid are added to the reaction mixture, whereupon the etherlayer is separated, washed with water and evaporated on a steam bath. The 5-ethyl-dibenzo [a,d]-cyclohepta[1,4]dien-5-ol thereby obtained is treated with a mixture of 50 milliliters of acetyl-chloride and 50 milliliters of aceticanhydride for ten minutes at 50° C., whereupon the reaction mixture is poured into 300 grams finely crushed ice, and the mixture is left standing at room temperature, until the excess of acetic anhydride is hydrolyzed. Thereafter the mixture is shaken with 300 milliliters of ether in a separatory funnel, and the etherphase is separated, dried and evaporated in a steam bath. The residue is distilled in vacuo, and 5-ethylidene-dibenzo [a,d]-cyclohepta [1,4] dien is obtained with the boiling point 160 degrees centigrade/2 mm. Hg. Yield 63 g.

63 grams of the ethylidene compound are dissolved in 315 milliliters of anhydrous formic acid and 40 milliliters of 35% hydrogenperoxide are added dropwise at a temperature of 60 degrees centigrade while stirring. The mixture is kept for two hours at 70 degrees centigrade, whereupon it is chilled and diluted with one liter of water and extracted with ether. The etherlayer is separted, washed with water and dilute sodiumhydroxide solution and the ether evaporated on a steam bath. To the residue, which contains 5-(1'-hydroxyethyl)-dibenzo [a,d] cyclohepta [1,4]diene-5-ol is added 140 milliliters of 25% (vol. percent) sulphuric acid, and the mixture is refluxed for two hours. After cooling the mixture is extracted with ether, and the etherphase is dried and evaporated on a steam bath. The residue is distilled in vacuo, and the fraction which boils at 165–175 degrees centigrade/1 mm. Hg. is isolated and recrystallized from petroleum ether. The 5-aceto-dibenzo [a,d]cyclohepta [1,4]diene thereby obtained as colourless crystals melts at 71–72 degrees centigrade.

A mixture of 12 grams of 5-aceto-dibenzo [a,d]cyclohepta [1,4]diene, 2.5 grams of paraformaldehyde, 6.5 grams of dimethylamine hydorchloride, 30 milliliters of ethanol and 0.3 milliliter of concentrated hydrochloric acid is refluxed on a steam bath for 19 hours. Thereupon the solvent is evaporated and the residue is shaken with water and ether. The water phase is separated, and aqueous ammonia is added in excess, to effect the separation of an oil which is extracted with ether. The ether phase is dried and evaporated at last in vacuo. The residue is dissolved in 50 milliliters of acetone, and a solution of hydrogenchloride in ether is added until a slight acid reaction. Thereby 10 grams of the hydrochloride of 5-(3'-dimethylaminopropionyl)-dibenzo [a,d] cyclohepta [1,4]diene crysallizes out as white crystals melting at 175–176 degrees centigrade.

The last mentioned hydrochloride is dissolved in 250 milliliters of methanol and is hydrogenated at 25 degrees centigrade and a pressure of 3 atmospheres for 4 hours with shaking and 0.5 gram of platinumoxide (Adams catalyst) as a catalyst. After filtering off the catalyst the filtrate is evaporated to dryness on a steam bath and 50 milliliters of acetone added to the residue. Thereby 9.5 grams of the hydrochloride of 5-(1'-hydroxy-3'-dimethylaminopropyl)-dibenzo [a,d] cyclohepta[1,4]-diene is obtained as a white crystalline substance which melts at 191–193 degrees centigrade.

Five grams of the last mentioned hydrochloride are dissolved in 10 milliliters of pyridine, and while cooling a solution of 10 milliliters of phosphorous oxychloride in 25 millimeters pyridine is added dropwise keeping the temperature of the reaction below 30 degrees centigrade. The mixture is then kept for 15 minutes at 30 degrees centigrade and for 40 minutes at 95 degrees centigrade. After cooling the reaction mixture is poured in 200 grams of finely crushed ice, and the resulting solution made alkaline with sodiumhydroxide. Then the mixture is extracted with ether, which is separated, dried and evaporated on a steam bath in vacuo. The residue is dissolved in a little acetone and a solution of hydrogenchloride in ether is added dropwise until slight acid reaction. Thereby 3.6 grams of the hydrochloride of 5 - (3' - dimethylaminopropylidene) - dibenzo[a,d]cyclohepta[1,4]diene crystallizes out as a white crystalline substance, which melts at 197–198 degrees centigrade.

*Example 2.—5-(3'-methylaminopropylidene)-dibenzo [a,d]cyclohepta[1,4]diene and its hydrochloride*

When Example 1 is carried out using 4.5 grams of methylamine instead of dimethylamine, the hydrochloride of 5-(3'-methylaminopropionyl)-dibenzo[a,d]cyclohepta [1,4]diene is obtained as a white crystalline substance melting at 170–172 degrees centigrade. When reducing this hydrochloride according to the procedure of Example 1 the hydrochloride of 5-1'-hydroxy-3'-methylaminopropyl)-dibenzo[a,d]-cyclohepta [1,4]diene is obtained as a white crystalline substance melting at 182–185 degrees centigrade. When dehydrating this hydrochloride according to the procedure of Example 1 except for the fact that after the reaction mixture is made alkaline with sodiumhydroxide the mixture is heated to 90 degrees centigrade and kept there for 5 minutes, the hydrochloride of 5-(3'-methylaminopropylidene)-dibenzo [a,d]cyclohepta[1,4]diene is obtained as a white crystalline substance melting at 215–216 degrees centigrade.

*Example 3.—5-(3'-morpholinopropylidene)-dibenzo [a,d]cyclohepta[1,4]diene and its hydrochloride*

When Example 1 is carried out using 13 grams of morpholine instead of dimethylamine, the hydrochoride of 5-(3'-morpholinopropionyl)-dibenzo[a,d]cyclohepta[1,4]diene is obtained as a white crystalline substance melting at 175–177 degrees centigrade. When reducing this hydrochloride according to the procedure of Example 1 the hydrochloride of 5-(1'-hydroxy-3'-morpholinopropyl)-dibenzo[a,d]-cyclohepta[1,4]diene is obtained as a white crystalline substance melting at 180–182 degrees centigrade. When dehydrating this hydrochloride according to the procedure of Example 1, the hydrochloride of 5-3'-morpholinopropylidene)-dibenzo[a,d]cyclohepta[1,4]diene is obtained as a white crystalline substance melting at 231–233 degrees centigrade.

*Example 4.—5-(3'-piperidinopropylidene)-dibenzo [a,d]cyclohepta[1,4]diene and its hydrochloride*

When Example 1 is carried out using 12.5 grams of piperidine instead of dimethylamine, the hydrochloride of 5-(3'-piperidinopropylidene)-dibenzo[a,d]cyclohepta[1,4]diene is obtained as colourless crystals melting at 217–218 degrees centigrade.

*Example 5.—3-chloro-5-(3'-dimethylaminopropylidene)-dibenzo[a,d]cyclohepta[1,4]diene and its hydrochloride*

When Example 1 is carried out using 78 grams of 3-chloro - dibenzo[a,d]cyclohepta[1,4]diene - 5 - on instead of dibenzo[a,d]cyclohepta[1,4]diene - 5 - on, the hydrochloride of 3 - chloro - 5 - (3' - dimethylaminopropylidene) - dibenzo[a,d]cyclohepta[1,4]diene is obtained as white crystals melting at 210–212 degrees centigrade.

The embodiments of the invention in which an exclusive property or privilege is claimed are defined as follows:

1. The process of producing a compound selected from the group consisting of dibenzo[a,d]cyclohepta[1,4] dienes of the formula:

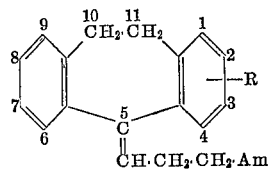

I wherein Am is selected from the group consisting of mono - lower - alkylamino, di - lower - alkylamino, morpholino, and piperidino, and R is selected from the group consisting of hydrogen, halogen, trifluoromethyl and lower-alkyl, and addition salts thereof with non-toxic acids, which comprises mixing and reacting a compound of the formula:

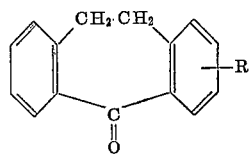

II wherein R is as defined above with an ethyl magnesium-halide and hydrolyzing the magnesium complex obtained to produce a compound of Formula III, dehydrating the compound of the formula:

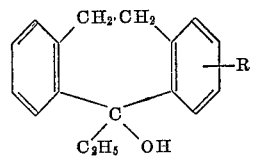

III thereby obtained to produce a compound of Formula IV, subjecting the resulting compound of the formula:

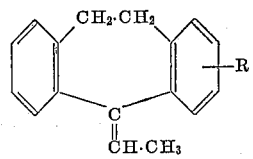

IV to reaction with an organic peroxyacid to produce a compound of Formula V, treating the compound of the formula:

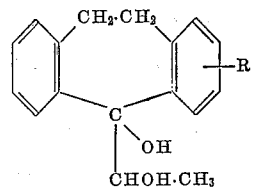

V thereby obtained with aqueous sulfuric acid to produce a compound of Formula VI, and reacting the resulting compound of the formula:

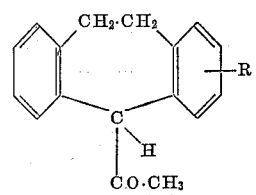

VI with formaldehyde and a salt of the amine AmH, wherein Am is as defined above, to produce a compound of Formula VII, whereupon the resulting compound of the formula:

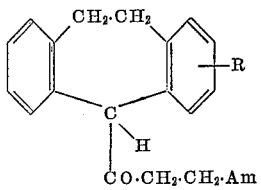

VII is reduced to produce a compound of Formula VIII, and the resulting compound of the formula:

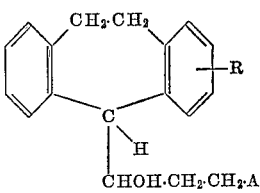

VIII dehydrated to produce a compound of Formula I, and isolating the dibenzo[a,d]cyclohepta[1,4]diene of the Formula I thereby obtained in the form of a member of the group consisting of the free base and an acid addition salt thereof.

2. The process of claim 1, wherein R is hydrogen and Am is dimethylamino.

3. The process of producing a compound selected from the group consisting of dibenzo[a,d]cyclohepta[1,4] dienes of the formula:

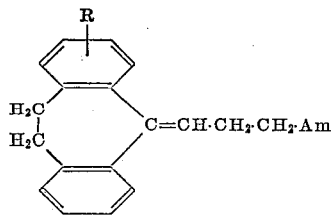

I wherein Am is selected from the group consisting of mono - lower - alkylamino, di - lower - alkylamino, morpholino, and piperidino, and R is selected from the group consisting of hydrogen, halogen, trifluoromethyl and lower-alkyl, and addition salts thereof with non-toxic acids, which comprises mixing and reacting a compound of the formula:

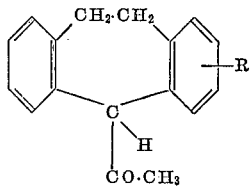

VI wherein R is as defined above with formaldehyde and a salt of the amine AmH wherein Am is as defined above to produce a compound of Formula VII, whereupon the resulting compound of the formula:

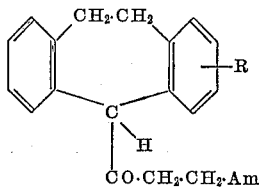

VII is reduced to produce a compound of Formula VIII, and the resulting compound of the formula:

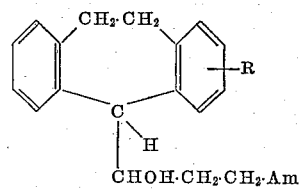

VIII dehydrated to produce a compound of Formula I, and isolating the dibenzo[a,d]cyclohepta[1,4] diene of the Formula I thereby obtained in the form of a member of the group consisting of the free base and an acid addition salt thereof.

4. The process of claim 3, wherein R is hydrogen and Am is dilower-alkylamino.

References Cited by the Examiner

UNITED STATES PATENTS

| | | | |
|---|---|---|---|
| 2,900,415 | 8/59 | Biel | 260—570.6 |
| 2,996,503 | 8/61 | Sprague et al. | 260—293.4 X |
| 3,073,847 | 1/63 | Doebel et al. | 260—570.5 |

FOREIGN PATENTS 1,109,166  6/61  Germany.

OTHER REFERENCES

Adams et al.: "Organic Reactions, vol. I, pp. 304–30, N.Y., Wiley & Sons, Inc., 1942.

Cope et al.: "Jour. Amer. Chem. Soc.," vol. 73, pages 1673–8 (1951).

Royals "Advanced Organic Chemistry," Prentice-Hall, Inc., pp. 248–331 (1954).

CHARLES B. PARKER, *Primary Examiner.*

L. ZITVER, *Examiner.*

UNITED STATES PATENT OFFICE
CERTIFICATE OF CORRECTION

Patent No. 3,215,739  November 2, 1965

Torkil O. Holm

It is hereby certified that error appears in the above numbered patent requiring correction and that the said Letters Patent should read as corrected below.

Column 1, line 12, for "dibnezo" read -- dibenzo --; column 2, line 51, for "and salt" read -- and a salt --; column 3, line 1, for "diene for" read -- diene of --; line 10, for "III-IX" read -- III-IV --; line 60, for "in a" read -- on a --; column 4, line 12, for "hydorchloride" read -- hydrochloride --; line 24, for "crysallizes" read -- crystallizes --; line 64, for "5-1′" read -- 5-(1′ --; column 5, line 14, for "5-3′" read -- 5-(3′ --.

Signed and sealed this 9th day of August 1966.

(SEAL)
Attest:

ERNEST W. SWIDER
Attesting Officer

EDWARD J. BRENNER
Commissioner of Patents